United States Patent
Boda et al.

(10) Patent No.: US 11,181,902 B2
(45) Date of Patent: Nov. 23, 2021

(54) REMOTE OPERATION SYSTEM, TRANSPORTATION SYSTEM, AND REMOTE OPERATION METHOD

(71) Applicant: HONDA MOTOR CO., LTD., Tokyo (JP)

(72) Inventors: Genta Boda, Wako (JP); Shogo Akaba, Wako (JP); Kazuyuki Kaneko, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 295 days.

(21) Appl. No.: 16/344,808

(22) PCT Filed: Nov. 11, 2016

(86) PCT No.: PCT/JP2016/083503
§ 371 (c)(1),
(2) Date: Apr. 25, 2019

(87) PCT Pub. No.: WO2018/087879
PCT Pub. Date: May 17, 2018

(65) Prior Publication Data
US 2020/0057436 A1    Feb. 20, 2020

(51) Int. Cl.
*G05D 1/00* (2006.01)
*G05D 1/02* (2020.01)

(52) U.S. Cl.
CPC ......... *G05D 1/0022* (2013.01); *G05D 1/0038* (2013.01); *G05D 1/0212* (2013.01); *G05D 2201/0213* (2013.01)

(58) Field of Classification Search
CPC .. G05D 1/0022; G05D 1/0038; G05D 1/0212; G05D 2201/0213; H04Q 9/00; G08G 1/09

(Continued)

(56) References Cited

U.S. PATENT DOCUMENTS 5,461,292 A * 10/1995 Zondlo ................. G01S 13/74
  180/169
8,185,302 B2 * 5/2012 Schunder ........... G01C 21/3469
  701/408

(Continued)

FOREIGN PATENT DOCUMENTS

CN    103777632    5/2014
CN    203894610    10/2014

(Continued)

OTHER PUBLICATIONS

International Search Report and Written Opinion for International Application No. PCT/JP2016/083503 dated Jan. 24, 2017, 7 pgs.

(Continued)

*Primary Examiner* — Muhammad Shafi
(74) *Attorney, Agent, or Firm* — Amin, Turocy & Watson, LLP

(57) ABSTRACT

A remote operation system for a vehicle includes a plurality of remote operation devices, each of which includes a communication unit configured to communicate with the vehicle and receive information including a remote operation request, a presentation unit configured to present a situation of the vehicle received from the vehicle by the communication unit to a remote operator, a reception unit configured to receive an operation of the remote operator, and a control unit configured to generate control information on the basis of the operation received by the reception unit and transmit the control information to the vehicle using the communication unit. A remote operation device having a good communication environment with respect to the vehicle transmitting the remote operation request among the plurality of remote operation devices executes the remote operation.

8 Claims, 11 Drawing Sheets

(58) Field of Classification Search
USPC .............................................................. 701/2
See application file for complete search history.

(56) References Cited

U.S. PATENT DOCUMENTS

| | | | |
|---|---|---|---|
| 9,494,439 B1* | 11/2016 | Ross | G05D 1/0027 |
| 2010/0106344 A1* | 4/2010 | Edwards | G05D 1/027 |
| | | | 701/2 |
| 2013/0261941 A1 | 10/2013 | Nishimura et al. | |
| 2015/0153733 A1 | 6/2015 | Ohmura et al. | |
| 2015/0248131 A1* | 9/2015 | Fairfield | G05D 1/0011 |
| | | | 701/2 |
| 2016/0272135 A1* | 9/2016 | Kim | B60R 16/037 |
| 2017/0259820 A1 | 9/2017 | Takahashi | |

FOREIGN PATENT DOCUMENTS

| | | |
|---|---|---|
| CN | 105984425 | 10/2016 |
| JP | 08-051673 | 2/1996 |
| JP | 2008-305151 | 12/2008 |
| JP | 2008-306544 | 12/2008 |
| JP | 2011-150516 | 8/2011 |
| JP | 2013-031389 | 2/2013 |
| JP | 2013-045290 | 3/2013 |
| JP | 2013-203283 | 10/2013 |
| JP | 2015-108860 | 6/2015 |
| JP | 2016-018238 | 2/2016 |
| WO | 2016-038931 | 3/2016 |

OTHER PUBLICATIONS

Chinese Office Action for Chinese Patent Application No. 201680090343.9 dated Jan. 25, 2021.

* cited by examiner

REMOTE OPERATION SYSTEM, TRANSPORTATION SYSTEM, AND REMOTE OPERATION METHOD

TECHNICAL FIELD

The present invention relates to a remote operation system, a transportation system, and a remote operation method.

BACKGROUND ART

In recent years, research on automated driving for automatically performing acceleration/deceleration and steering has been conducted. Technology in which two-way communication with a vehicle is performed during automated driving and the vehicle communicates with an external device and executes heteronomously-oriented automated driving based on a remote operation in a case that in a case that a determination means determines that autonomously-oriented automated driving cannot be executed has been studied (see Patent Literature 1).

Also, in a case that in a case that remote operation of a vehicle is performed, a time lag (a communication lag) due to a delay of communication may occur between a scene at a point in time in a case that in a case that an actual traveling state was imaged and a video displayed on a screen for allowing an operator who performs a remote operation to perform an operation. In relation thereto, an automatic lawn mower that performs automated driving by acquiring the position of a host vehicle using a Global Positioning System (GPS) has been described. This automatic lawn mower is disclosed as the invention of a device including a communication means for performing a remote operation, a control means for controlling steering and a drive system, and a position prediction means for predicting a position at which a corrected control operation is performed in consideration of a communication lag on the basis of received position information (see Patent Literature 2).

CITATION LIST

Patent Literature

Patent Literature 1

PCT International Publication No. WO2016/038931

Patent Literature 2

Japanese Unexamined Patent Application, First Publication No. 2013-031389

SUMMARY OF INVENTION

Technical Problem

However, in the conventional technology, no consideration has been given to performing a remote operation in a good communication environment.

The present invention has been made in consideration of such circumstances and an objective of the present invention is to provide a remote operation system, a transportation system, and a remote operation method capable of performing a remote operation in a good communication environment.

Solution to Problem

According to the invention of claim 1, there is provided a remote operation system (1) for a vehicle, the remote operation system including: a plurality of remote operation devices (320), each of which includes a communication unit (310) configured to communicate with the vehicle (M) and receive information including a remote operation request; a presentation unit (321) configured to present a situation of the vehicle received from the vehicle by the communication unit to a remote operator; a reception unit (330) configured to receive an operation of the remote operator; and a control unit (340) configured to generate control information on the basis of the operation received by the reception unit and transmit the control information to the vehicle using the communication unit, wherein a remote operation device having a good communication environment with respect to the vehicle transmitting the remote operation request among the plurality of remote operation devices executes a remote operation.

According to the invention of claim 2, in the invention of claim 1, the remote operation system further includes a selection unit (311) configured to select the remote operation device having the good communication environment with respect to the vehicle transmitting the remote operation request among the plurality of remote operation devices.

According to the invention of claim 3, in the invention of claim 2, any one of the remote operation devices having a short communication distance, a highest communication rate, or most stable communication with respect to the vehicle transmitting the remote operation request is preferentially selected.

According to the invention of claim 4, in the invention of claim 1, a future situation of the vehicle is estimated on the basis of the situation of the vehicle received from the vehicle by the communication unit and the estimated future situation of the vehicle is presented to the remote operator.

According to the invention of claim 5, in the invention of claim 4, the presentation unit displays an image based on the situation of the vehicle received from the vehicle by the communication unit and further displays an image obtained by enlarging a part of an image based on the situation of the vehicle received from the vehicle by the communication unit as an image indicating the future situation of the vehicle in a case that the situation of the vehicle received from the vehicle by the communication unit is a situation in which there are few physical objects in front of the vehicle.

According to the invention of claim 6, in the invention of claim 4, the communication unit acquires information about an action plan of automated driving from the vehicle and the presentation unit estimates the future situation of the vehicle on the basis of the action plan.

According to the invention of claim 7, in the invention of claim 4, the remote operation system generates an image indicating the future situation of the vehicle by synthesizing a fixed point observation image and an image based on the situation of the vehicle received from the vehicle by the communication unit.

According to the invention of claim 8, in the invention of claim 1, the remote operation system includes a determination unit configured to determine whether or not a route including a predicted communication failure occurrence position is included in a scheduled route along which the vehicle will travel; and a change unit configured to change a route so that the predicted communication failure occurrence position is avoided in a case that the determination unit determines that the route including the predicted communication failure occurrence position is included.

According to the invention of claim 9, there is provided a transportation system including: the remote operation system according to claim 1; and a vehicle control system mounted on the vehicle that receives the remote operation.

According to the invention of claim 10, in the invention of claim 9, the vehicle control system estimates a future situation of the vehicle on the basis of a situation of the vehicle and transmits the estimated future situation of the vehicle to the remote operation system.

According to the invention of claim 11, in the invention of claim 10, the vehicle control system executes automated driving on the basis of an action plan and estimates the future situation of the vehicle on the basis of the action plan.

According to the invention of claim 12, there is provided a remote operation method in which a plurality of remote operation devices communicate with a vehicle, receive information including a remote operation request, present a situation of the vehicle received from the vehicle to a remote operator, receive an operation of the remote operator, generate control information on the basis of the received operation, and transmit the control information to the vehicle, the remote operation method including: executing, by a remote operation device having a good communication environment with respect to the vehicle transmitting the remote operation request among the plurality of remote operation devices, a remote operation.

Advantageous Effects of Invention

According to the inventions of claims 1, 2, 9, and 12, it is possible to reduce a communication lag because a remote operation device having a small lag of communication with the vehicle among the plurality of remote operation devices is selected.

According to the inventions of claims 3 to 7 and 9 to 11, it is possible to receive a necessary operation at a future position of the vehicle from the remote operator because an image indicating an estimated situation obtained by estimating a situation of the vehicle that has been imaged is generated and displayed even in a case that there is a communication lag between the vehicle and the remote operation device.

According to the invention of claim 8, it is possible to improve safety of a remote operation of the vehicle for performing rerouting to a route for avoiding a position at which it is predicted that a communication failure will occur.

DESCRIPTION OF EMBODIMENTS

Hereinafter, embodiments of a remote operation system, a transportation system, a remote operation method, and a remote operation program of the present invention will be described with reference to the drawings.

First Embodiment

[System Configuration]

Figure 1:
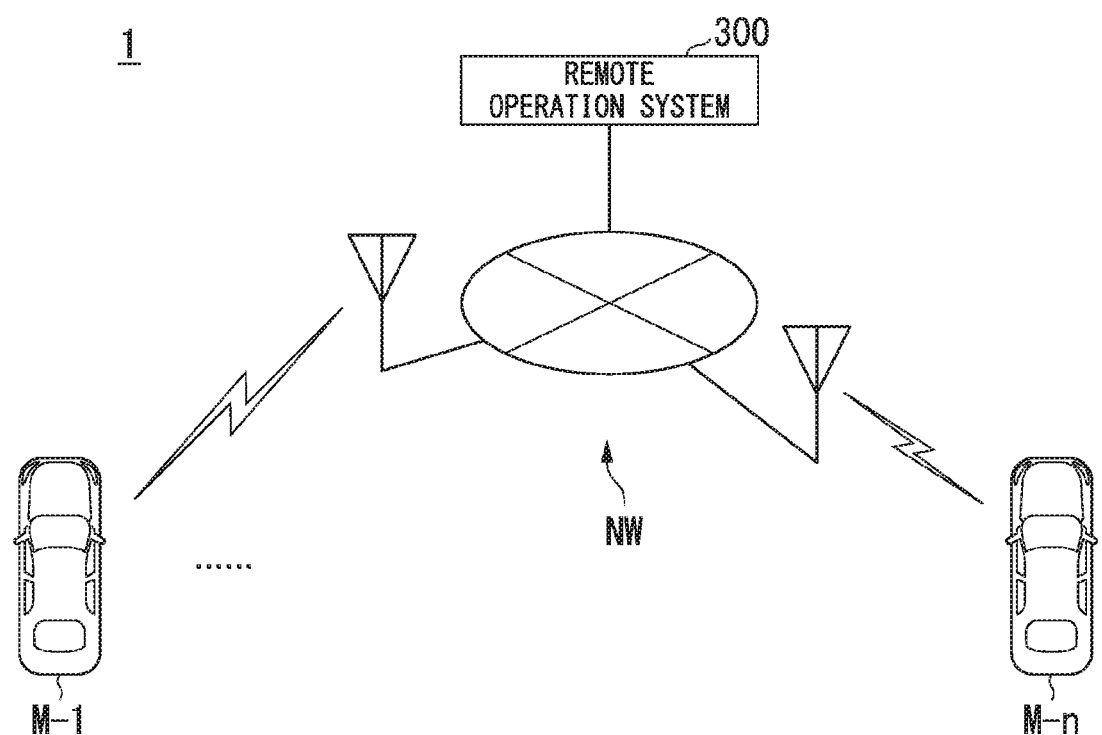
FIG. 1 is a conceptual view of a transportation system 1.

FIG. 1 is a conceptual diagram of a transportation system 1. The transportation system 1 is implemented by a plurality of vehicles M-1 to M-n (n is any natural number) and a remote operation system 300 communicating with each other via a network NW. Hereinafter, the vehicle is referred to as a vehicle M unless the vehicles are distinguished. The vehicle M is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a power generator connected to the internal combustion engine, or discharge power of a secondary battery or a fuel cell. Also, the vehicle M is a vehicle capable of performing automated driving that automatically controls at least one of acceleration/deceleration or steering. The network NW includes a base station that is an interface for wireless communication, a wide area network (WAN), a local area network (LAN), the Internet, a dedicated circuit, a satellite circuit, and the like.

In the transportation system 1, a remote operation request is transmitted from the vehicle M to the remote operation system 300 or from one vehicle M to another vehicle M and a remote operation of the vehicle M is executed in accordance with the remote operation request.

[Vehicle Configuration]

Figure 2:
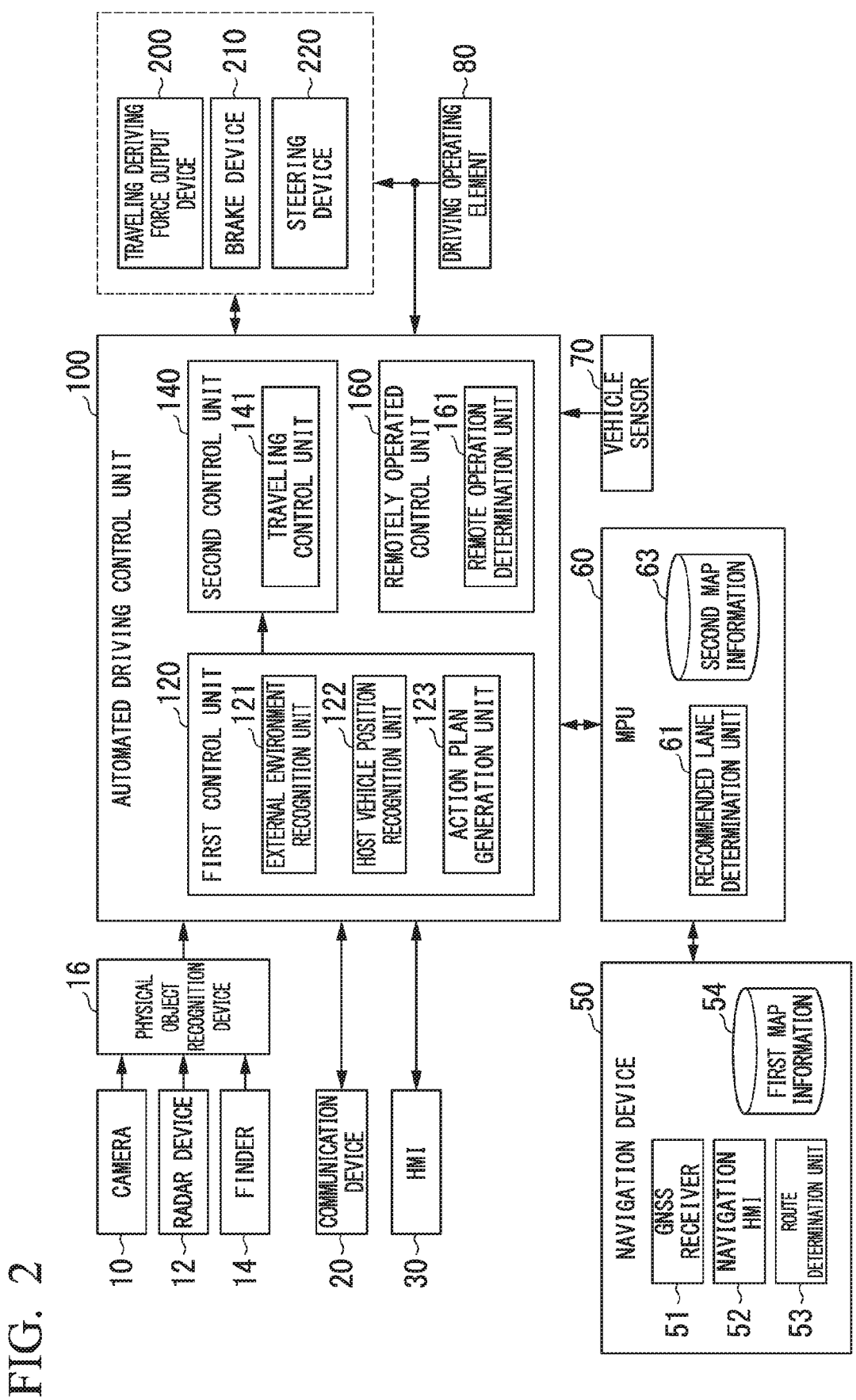
FIG. 2 is a diagram showing an example of components mounted on a vehicle M.

First, components mounted on the vehicle M will be described. FIG. 2 is a diagram showing an example of components mounted on the vehicle M. On the vehicle M, for example, a camera 10, a radar device 12, a finder 14, a physical object recognition device 16, a communication device 20, a human machine interface (HMI) 30, a navigation device 50, a micro-processing unit (MPU) 60, a vehicle sensor 70, a driving operating element 80, an automated driving control unit 100, a traveling driving force output device 200, a brake device 210, and a steering device 220 are mounted. These devices and apparatuses are connected to each other by a multiplex communication line such as a controller area network (CAN) communication line, a serial communication line, a wireless communication network, or the like. Also, the configuration shown in FIG. 2 is merely an example, and a part of the configuration may be omitted or other components may also be added thereto. Although the configuration shown in FIG. 2 includes at least the camera 10, the communication device 20, the driving operating elements 80, a first control unit 120, a second control unit 140, and a remotely operated control unit 160, the configuration is an example of a "vehicle control device".

For example, the camera 10 is a digital camera using a solid-state imaging device such as a charge coupled device (CCD) or a complementary metal oxide semiconductor (CMOS). One or more cameras 10 are attached to any position on the host vehicle M. In a case that a view in front is imaged, the camera 10 is attached to an upper portion of a front windshield, a rear surface of a rearview mirror, or the like. For example, the camera 10 periodically and iteratively images the vicinity of the vehicle M. The camera 10 may be a stereo camera.

The radar device 12 radiates radio waves such as millimeter waves around the vehicle M and detects at least a position (a distance to and a direction) of a physical object by detecting radio waves (reflected waves) reflected by the physical object. One or more radar devices 12 are attached to any position on the vehicle M. The radar device 12 may detect a position and speed of the physical object in a frequency modulated continuous wave (FM-CW) scheme.

The finder 14 is a light detection and ranging or laser imaging detection and ranging (LIDAR) finder configured to measure scattered light with respect to radiated light and detect a distance to an object. One or more finders 14 are attached to any position on the vehicle M.

The physical object recognition device 16 performs a sensor fusion process on detection results from some or all of the camera 10, the radar device 12, and the finder 14 to recognize a position, a type, speed, and the like of a physical object. The physical object recognition device 16 outputs recognition results to the automated driving control unit 100.

The communication device 20 communicates with other vehicles present in the vicinity of the host vehicle M using, for example, a cellular network, a Wi-Fi network, Bluetooth (registered trademark), dedicated short range communication (DSRC), or the like or communicates with various types of server devices or the remote operation system 300 via a wireless base station.

The HMI 30 presents various types of information to an occupant of the vehicle M and receives an input operation of the occupant. The HMI 30 includes various types of display devices, a speaker, a buzzer, a touch panel, a switch, keys, and the like.

For example, the navigation device 50 includes a global navigation satellite system (GNSS) receiver 51, a navigation HMI 52, and a route determination unit 53, and stores first map information 54 in a storage device such as a hard disk drive (HDD) or a flash memory. The GNSS receiver identifies a position of the vehicle M on the basis of a signal received from a GNSS satellite. The position of the vehicle M may be identified or supplemented by an inertial navigation system (INS) using an output of the vehicle sensor 70. The navigation HMI 52 includes a display device, a speaker, a touch panel, keys, and the like. The navigation HMI 52 may be partly or wholly shared with the above-described HMI 30. For example, the route determination unit 53 determines a route from the position of the vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by links. The first map information 54 may include a curvature of a road, point of interest (POI) information, and the like. Also, the route determination unit 53 determines a route for avoiding a predicted communication failure occurrence position to be described below if possible. The route determined by the route determination unit 53 is output to the MPU 60. Also, the navigation device 50 may perform route guidance using the navigation HMI 52 on the basis of the route determined by the route determination unit 53. For example, the navigation device 50 may be implemented by a function of a terminal device such as a smartphone or a tablet terminal owned by the user. Also, the navigation device 50 may transmit a current position and a destination to a navigation server via the communication device 20 and acquire a route returned from the navigation server.

For example, the MPU 60 serves as a recommended lane determination unit 61 and stores second map information 63 in a storage device such as an HDD or a flash memory. The recommended lane determination unit 61 divides the route on the map provided from the navigation device 50 into a plurality of blocks (for example, divides the route every 100 [m] with respect to a traveling direction of the vehicle), and determines a recommended lane for each block with reference to the second map information 63. The recommended lane determination unit 61 determines on what lane numbered from the left the vehicle will travel. The recommended lane determination unit 61 determines the recommended lane so that the vehicle M can travel along a reasonable traveling route for traveling to a junction destination in a case that there is a junction, an interchange, or the like in the route.

The second map information 63 is map information which has higher accuracy than the first map information 54. For example, the second map information 63 includes information about a center of a lane or information about a boundary of a lane. Also, the second map information 63 may include road information, traffic regulations information, address information (an address/zip code), facility information, telephone number information, and the like. The road information includes information indicating types of road such as expressways, toll roads, national highways, and prefectural roads, information about the number of lanes on a road, a width of each lane, a gradient of a road, a position of a road (three-dimensional coordinates including longitude, latitude, and height), a curvature of a curve of a lane, positions of merging and branching points of lanes, signs provided on a road, a predicted communication failure occurrence position, a recommended remote operation point, and the like. The predicted communication failure occurrence position is a position at which the occurrence of a communication failure is predicted such as a tunnel, a valley between buildings, or underground where the communication environment is poor. The recommended remote operation point is a point where a complicated operation is required in a steering wheel operation, an accelerator operation, or the like at which automated driving is difficult at a crowded point or the like. The recommended remote operation point is determined from past statistical data and the like. The second map information 63 may be updated as needed by accessing another device using the communication device 20.

The MPU 60 refers to the route determined by the route determination unit 53, the second map information 63, and the action plan generated by the action plan generation unit 123 to be described below and determines whether or not there is a predicted communication failure occurrence position in the recommended lane. In a case that the MPU 60 detects a predicted communication failure occurrence position in a scheduled traveling route, a route is rerouted such that the route including the communication failure occurrence predicted position is avoided and a route in which a communication failure does not occur is followed. The component of the MPU 60 may be mounted on the remote operation system 300.

The vehicle sensor 70 includes a vehicle speed sensor configured to detect speed of the vehicle M, an acceleration sensor configured to detect acceleration, a yaw rate sensor configured to detect angular velocity around a vertical axis, a direction sensor configured to detect a direction of the vehicle M, and the like.

For example, the driving operating element 80 includes an accelerator pedal, a brake pedal, a shift lever, a steering wheel, and other operating elements. A sensor configured to detect an amount of operation or the presence or absence of an operation is attached to the driving operating element 80, and a detection result thereof is output to the automated driving control unit 100 or one or all of the traveling driving force output device 200, the brake device 210, and the steering device 220.

For example, the automated driving control unit 100 includes a first control unit 120, a second control unit 140, and a remotely operated control unit 160. For example, each of the first control unit 120, the second control unit 140, and the remotely operated control unit 160 is implemented by a processor such as a central processing unit (CPU) executing a program (software). Some or all of the functional units of the first control unit 120, the second control unit 140, and the remotely operated control unit 160 to be described below are implemented, for example, by hardware (a circuit unit including circuitry) such as large scale integration (LSI), an application specific integrated circuit (ASIC), or a field-programmable gate array (FPGA) or may be implemented by cooperation between software and hardware.

For example, the first control unit 120 includes an external environment recognition unit 121, a host vehicle position recognition unit 122, and an action plan generation unit 123.

The external environment recognition unit 121 recognizes positions of nearby vehicles, and states of velocity and acceleration thereof on the basis of information input directly from the camera 10, the radar device 12, and the finder 14 or via the physical object recognition device 16. The position of the nearby vehicle may be represented by a representative point such as a center of gravity or a corner of the nearby vehicle or may be represented by a region represented by a contour of the nearby vehicle. The "state" of the nearby vehicle may include acceleration or jerk of the nearby vehicle or an "action state" (for example, whether or not a lane change is being made or intended). Also, the external environment recognition unit 121 may recognize positions of guardrails, electricity poles, parked vehicles, pedestrians, and other physical objects in addition to nearby vehicles.

For example, the host vehicle position recognition unit 122 recognizes a lane (a traveling lane) in which the vehicle M is traveling and a position and orientation of the vehicle M relative to the traveling lane. For example, the host vehicle position recognition unit 122 recognizes a traveling lane by comparing a pattern of a road dividing line (for example, an arrangement of solid lines and broken lines) obtained from the second map information 63 with a pattern of road dividing lines around the vehicle M recognized from the image captured by the camera 10. In this recognition, the position of the vehicle M acquired from the navigation device 50 and the processing result of the INS may be added.

Figure 3:
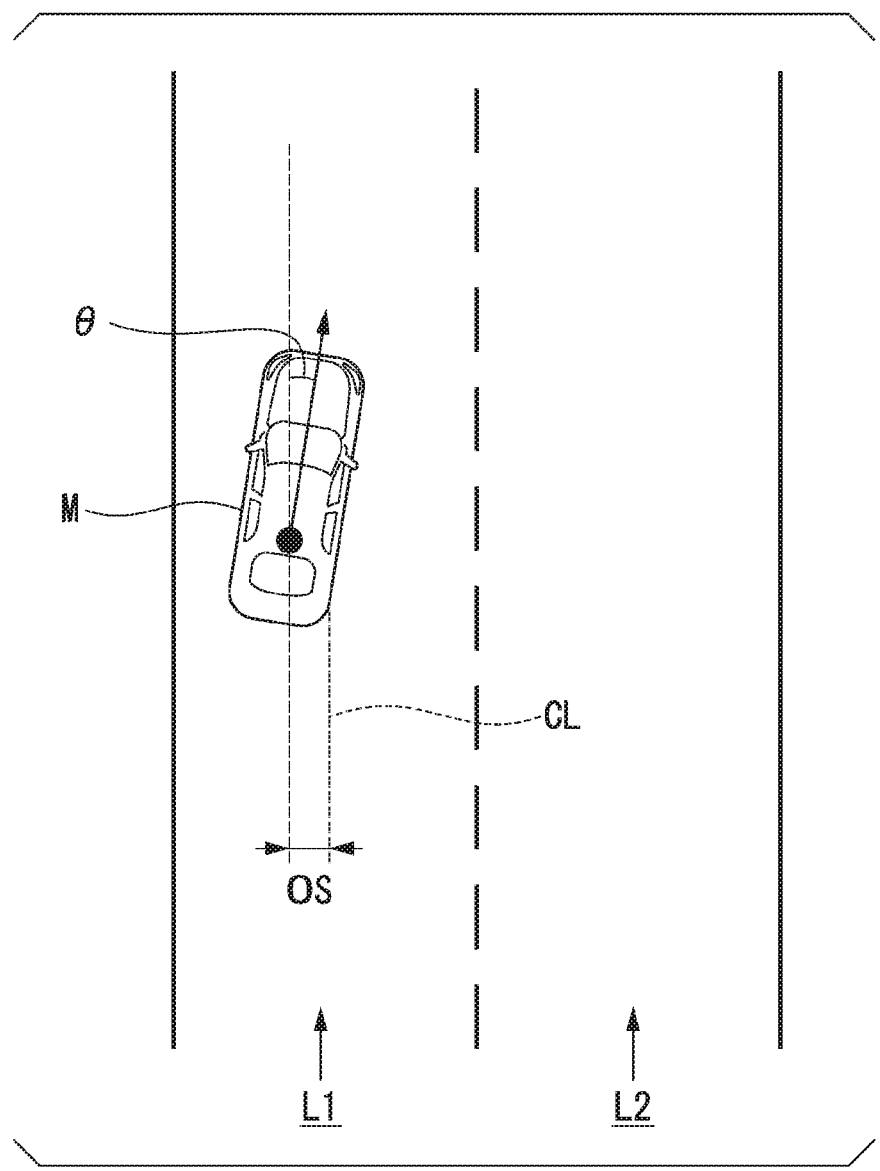
FIG. 3 is a view showing a state in which a relative position and orientation of the vehicle M with respect to a traveling lane L1 are recognized by the host vehicle position recognition unit 122.

For example, the host vehicle position recognition unit 122 recognizes a position and an orientation of the vehicle M with respect to the traveling lane. FIG. 3 is a diagram showing a state in which a position and orientation of the vehicle M relative to a traveling lane L1 are recognized by the host vehicle position recognition unit 122. For example, the host vehicle position recognition unit 122 recognizes a deviation OS of a reference point (for example, a center of gravity) of the vehicle M from a traveling lane center CL and an angle θ formed with respect to a line connecting the traveling lane center CL in a traveling direction of the vehicle M as the position and the orientation of the vehicle M relative to the traveling lane L1. Also, instead, the host vehicle position recognition unit 122 may recognize a position of a reference point of the vehicle M or the like with respect to one side end of the traveling lane L1 as a relative position of the vehicle M with respect to the traveling lane. The relative position of the vehicle M recognized by the host vehicle position recognition unit 122 is provided to the recommended lane determination unit 61 and the action plan generation unit 123.

The action plan generation unit 123 generates an action plan for the vehicle M to perform automated driving to a destination or the like. The action plan includes information about events to be sequentially executed in automated driving and a target trajectory on which the vehicle M will travel in each event in the future. The action plan generation unit 123 determines the events to be sequentially executed in the automated driving so that the vehicle M travels along the recommended lane determined by the recommended lane determination unit 61 and can cope with a surrounding situation of the vehicle M. The events include, for example, a constant-speed traveling event for traveling on the same traveling lane at constant speed, a following traveling event for following a preceding vehicle, a lane change event, an interchange event, a junction event, an emergency stop event, a remote operation event for performing switching from automated driving to manual driving, and the like. Also, during execution of these events, actions for avoidance may be planned on the basis of a surrounding situation of the vehicle M (presence of nearby vehicles and pedestrians, lane narrowing due to road construction, or the like).

The action plan generation unit 123 generates a target trajectory on which the vehicle M will travel in the future. For example, the target trajectory includes a velocity element. For example, the target trajectory is generated as a set of target points (trajectory points) at which the vehicle will arrive at a plurality of future reference clock times after the future reference clock times are set for each predetermined sampling time (for example, about several tenths of a second [sec]). Thus, if a width between the trajectory points is wide, this indicates that the vehicle travels in a section between the trajectory points at high speed.

Figure 4:
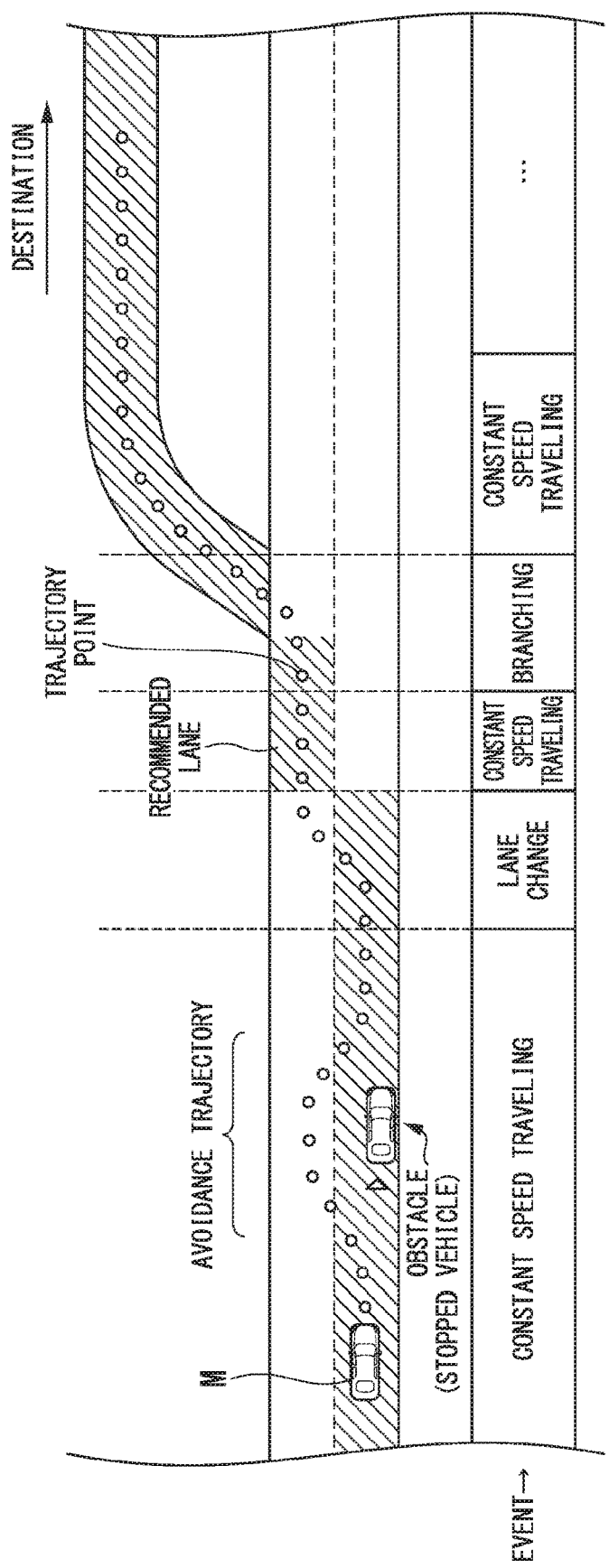
FIG. 4 is a diagram showing a state in which a target trajectory is generated on the basis of a recommended lane.

FIG. 4 is a diagram showing a state in which the target trajectory is generated on the basis of the recommended lane. As shown, the recommended lane is set to be convenient for traveling along a route to a destination. In a case that the vehicle approaches a predetermined distance before a switching point of the recommended lane (which may be determined in accordance with a type of event), the action plan generation unit 123 activates a lane change event, a junction event, an interchange event, or the like.

If it becomes necessary to avoid an obstacle during the execution of one event, an avoidance trajectory is generated as shown. For example, the action plan generation unit 123 generates a plurality of candidates for a target trajectory and selects an optimum target trajectory at that point in time on the basis of viewpoints of safety and efficiency. Also, the action plan generation unit 123 activates a remote operation event in a case that the vehicle M reaches a route including the recommended remote operation point in a route.

For example, the second control unit 140 includes a traveling control unit 141. The traveling control unit 141 controls the traveling driving force output device 200, the brake device 210, and the steering device 220 so that the vehicle M passes along the target trajectory generated by the action plan generation unit 123 at scheduled clock times.

A function of the remotely operated control unit 160 will be described below.

The traveling driving force output device 200 outputs a traveling driving force (a torque) to driving wheels for the vehicle to travel. For example, the traveling driving force output device 200 includes a combination of an internal combustion engine, an electric motor, a transmission, and the like, and an ECU configured to control them. The ECU controls the above-described components in accordance with information input from the automated driving control unit 100 or information input from the driving operating element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the automated driving control unit 100 or the information input from the driving operating element 80 so that a brake torque according to a braking operation is output to each wheel. The brake device 210 may include a mechanism configured to transfer the hydraulic pressure generated by an operation of the brake pedal included in the driving operating element 80 to the cylinder via a master cylinder as a backup. Also, the brake device 210 is not limited to the above-described configuration and may be an electronically controlled hydraulic brake device configured to control the actuator in accordance with information input from the traveling control unit 141 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the automated driving control unit 100 or the information input from the driving operating element 80 to change the direction of the steerable wheels.

[Remotely Operated Control]

Remotely operated control according to the present embodiment will be described below. In a case that the remote operation event is activated, the remotely operated control unit 160 requests the remote operation system 300 to perform a remote operation (transmits a remote operation request) using the communication device 20 and is subjected to a remote operation for basically controlling at least one of acceleration/deceleration or steering of the vehicle M on the basis of control information received from the remote operation system 300. The remotely operated control unit 160 includes, for example, a remote operation determination unit 161. In a case that the remote operation event has been activated, the remote operation determination unit 161 stops the automated driving of the vehicle M and switches the operation of the vehicle M to the remote operation.

[Vehicle Outside Facility]

Figure 5:
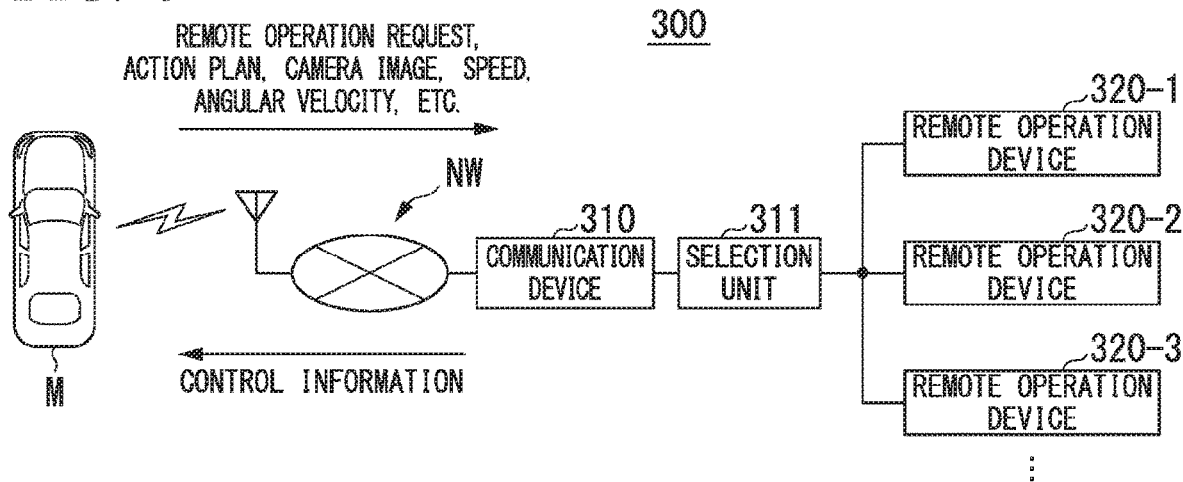
FIG. 5 is a diagram showing a device configuration in a remote operation system 300.

Hereinafter, a vehicle outside facility of a remote operation side will be described. FIG. 5 is a diagram showing a device configuration in the remote operation system 300. As shown, a communication device (communication unit) 310 that communicates with the vehicle M (a remotely operated vehicle) via the network NW, a selection unit 311, and a plurality of remote operation devices 320-1, 320-2, 320-3, and the like are provided in the remote operation system 300. Hereinafter, in a case that the remote operation devices are not distinguished, they are simply described as the remote operation devices 320. In each of the remote operation devices 320, the remote operator sits and stands by in preparation for a remote operation request. The communication device 310 receives a remote operation request from the vehicle M.

The selection unit 311 selects any one remote operation device 320 having a good communication environment with respect to the vehicle transmitting the remote operation request. The fact that the communication environment is good indicates, for example, that the communication speed is high, or that communication is unlikely to be disconnected and is stable, or that the communication distance is short. The fact that the communication distance is short indicates a state of wireless communication in which a distance at which radio waves transmitted from a transmission side reach a reception side is short. The selection unit 311 preferentially selects any one of the remote operation devices 320 for which a distance of communication with the vehicle M transmitting the remote operation request is short, the communication speed is highest, or the communication is most stable. The communication device 310 transmits information (a remote operation request, an action plan, an image captured by the camera 10, speed, angular velocity, a type of vehicle, and the like) from the vehicle M to the selected remote operation device 320 and causes a remote operation to be performed.

Also, the remote operation system 300 may be configured so that switching from the automated driving of the vehicle M to the remote operation is performed in a case that the vehicle M reaches a route including a recommended remote operation point in the route on the basis of the action plan of the vehicle M received from the communication device 310. In addition, the remote operation system 300 may be configured so that switching from the automated driving of the vehicle M to the remote operation is performed in a case that a remote operation recommended point is added by update or the like and the vehicle M reaches a route including the added recommended remote operation point in a traveling route. Thereby, the remote operation system 300 can perform switching of the remote operation also according to a determination of the remote operation system 300 side even if no remote operation request is transmitted from the vehicle M.

Figure 6:
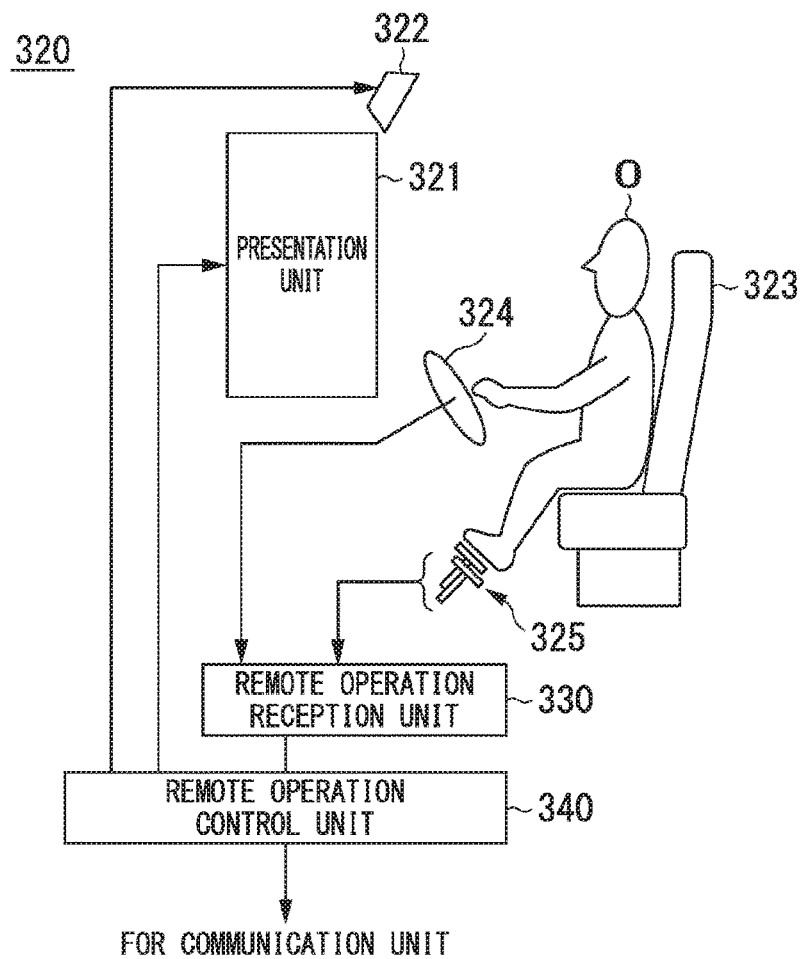
FIG. 6 schematically shows a configuration of a remote operation device 320.

FIG. 6 is a diagram schematically showing a configuration of the remote operation device 320. The remote operation device 320 includes, for example, a presentation unit 321, a speaker 322, a seat 323, a steering wheel 324, pedals 325 such as an accelerator pedal and a brake pedal, a remote operation reception unit (reception unit) 330, and a remote operation control unit (control unit) 340. The remote operation reception unit 330 receives an operation of a remote operator O. The remote operation control unit 340 generates control information on the basis of the operation received by the remote operation reception unit 330 and transmits the control information to the vehicle M using the communication device 310.

Figure 7:
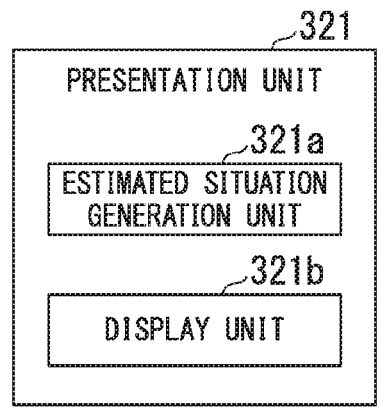
FIG. 7 is a block diagram showing a configuration of a presentation unit 321.

FIG. 7 is a block diagram showing a configuration of the presentation unit 321. The presentation unit 321 presents information including a situation of the vehicle M received from the vehicle M to the remote operator O. The presentation unit 321 includes an estimated situation generation unit 321a and a display unit 321b. The estimated situation generation unit 321a is implemented by a processor such as a CPU executing a program (software). Also, the estimated situation generation unit 321a may be implemented by hardware such as an LSI, an ASIC, or an FPGA or may be implemented by cooperation between software and hardware.

The display unit 321b is, for example, a liquid crystal display (LCD) or an organic electroluminescence (EL) display device and displays an image or information. The display unit 321b may be a head mount display (HMD). The display unit 321b displays, for example, an image of a landscape outside the vehicle imaged by the camera 10 of the vehicle M, the speed of the vehicle M, the engine speed, and the like.

Figure 8:
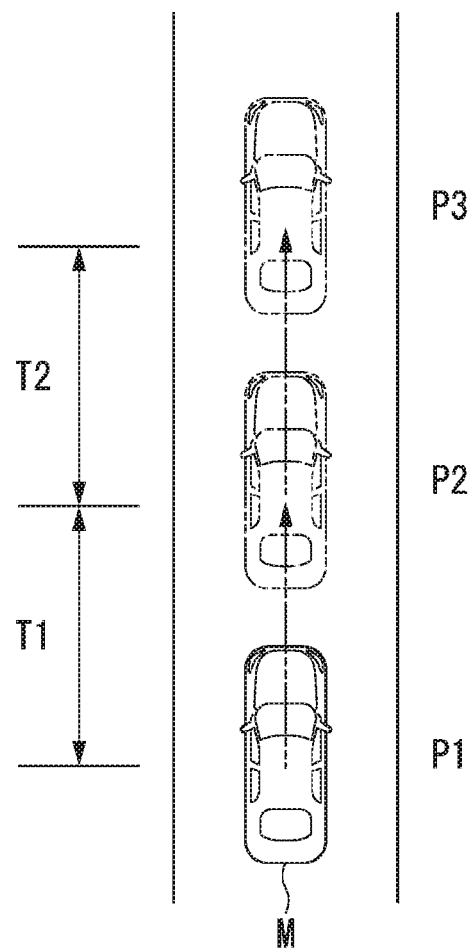
FIG. 8 shows the movement of the vehicle M while a communication lag is occurring.

Here, a communication lag is assumed to occur in the communication between the vehicle M and the remote operation device 320. FIG. 8 is a diagram showing the movement of the vehicle M while the communication lag is occurring. In a case that the display unit 321b displays the situation of the vehicle M as it is, a temporal uplink communication lag in communication between the vehicle M and the remote operation device 320 occurs.

The uplink communication lag includes a time required for communication between the vehicle M and the remote operation system 300, a required processing time from the reception of information from the vehicle M in the remote operation system 300 to the display of the image on the display unit 321a, or the like. For example, in a case that the situation of the vehicle M is imaged at a position P1, the situation thereof is displayed on the display unit 321b. At this time, the uplink communication lag takes a time T1 and the vehicle M moves from the position P1 to a position P2.

Then, after the remote operator O views the display unit 321b and performs an operation, a downlink communication lag occurs even until the vehicle M responds to the operation. The downlink communication lag includes a time until the vehicle M receives control information from an operation time of the remote operator O, a processing time before the vehicle M starts an operation based on the control information, and the like. The downlink communication lag takes a time T2 and the vehicle M moves from the position P2 to a position P3. Accordingly, in a case that the operator O performs an operation necessary for the situation of the vehicle M at the position P1 to be viewed, the vehicle M for which the operation is started is at the position P3 and a deviation in the remote operation occurs.

Therefore, the display unit 321b displays an image obtained by pre-reading the situation of the vehicle M so that an influence of uplink and downlink communication lags is reduced. The pre-reading refers to estimating a future situation of the vehicle M in a case that a predetermined time has elapsed from the situation of the vehicle M at the time of imaging. For example, the estimated situation generation unit 321a pre-reads the situation of the vehicle M received from the vehicle M, generates an image indicating the estimated situation estimated from the situation of the vehicle M at the time of imaging, and displays the image on the display unit 321b.

The predetermined time is determined by summing the assumed communication lags. For example, a sum of the time T1 required for the uplink communication lag and the time T2 required for the downlink communication lag is calculated as a total communication lag.

Figure 9:
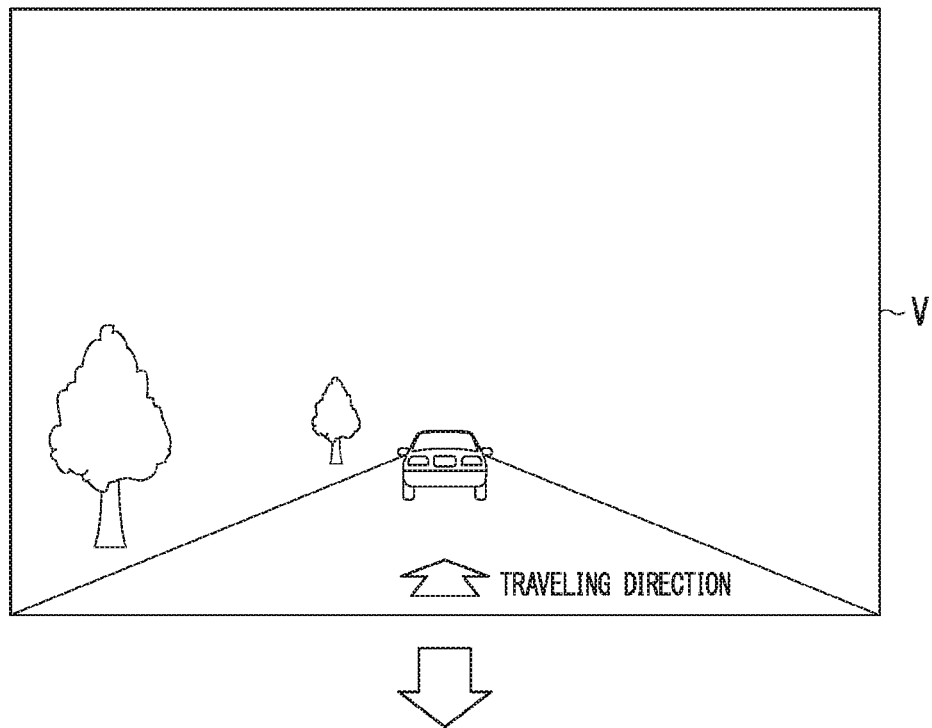
FIG. 9 is a diagram showing an estimated situation generated on the basis of a captured image V.
Figure 9:
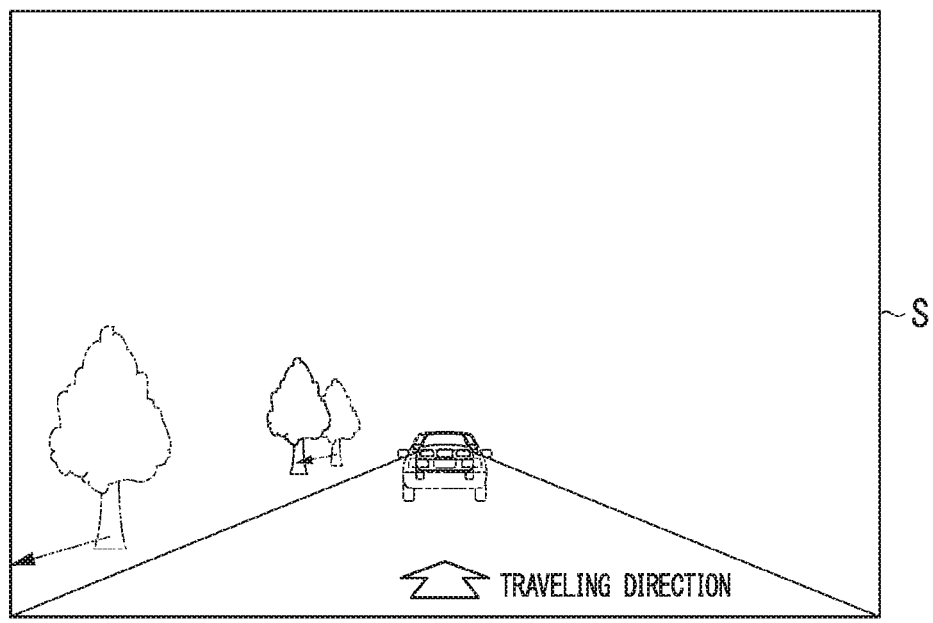

FIG. 9 is a view showing an image based on an estimated situation generated on the basis of an image V captured by the camera 10. The estimated situation generation unit 321a generates an estimated situation for the situation of the vehicle M at the position P3 on the basis of the image V of the situation of the vehicle M imaged at the position P1. The estimated situation generation unit 321a generates an image indicating the estimated situation, for example, by processing an image captured by the camera 10. For example, the estimated situation generation unit 321a generates the estimated situation by moving an image of an imaged scene or physical object on the basis of information such as the speed and the moving direction of the vehicle M.

In a case that the physical object is moving, the estimated situation generation unit 321a compares successive image frames to estimate a movement amount and a movement direction of the physical object. Then, the estimated situation generation unit 321a estimates a position of the physical object in a case that a predetermined time has elapsed on the basis of the information about the speed and the moving direction of the vehicle, and generates an image S indicating the estimated situation. Also, in the image S indicating the estimated situation, for example, a simple frame line indicating the future position of the imaged physical object or landscape may be shown.

Figure 10:
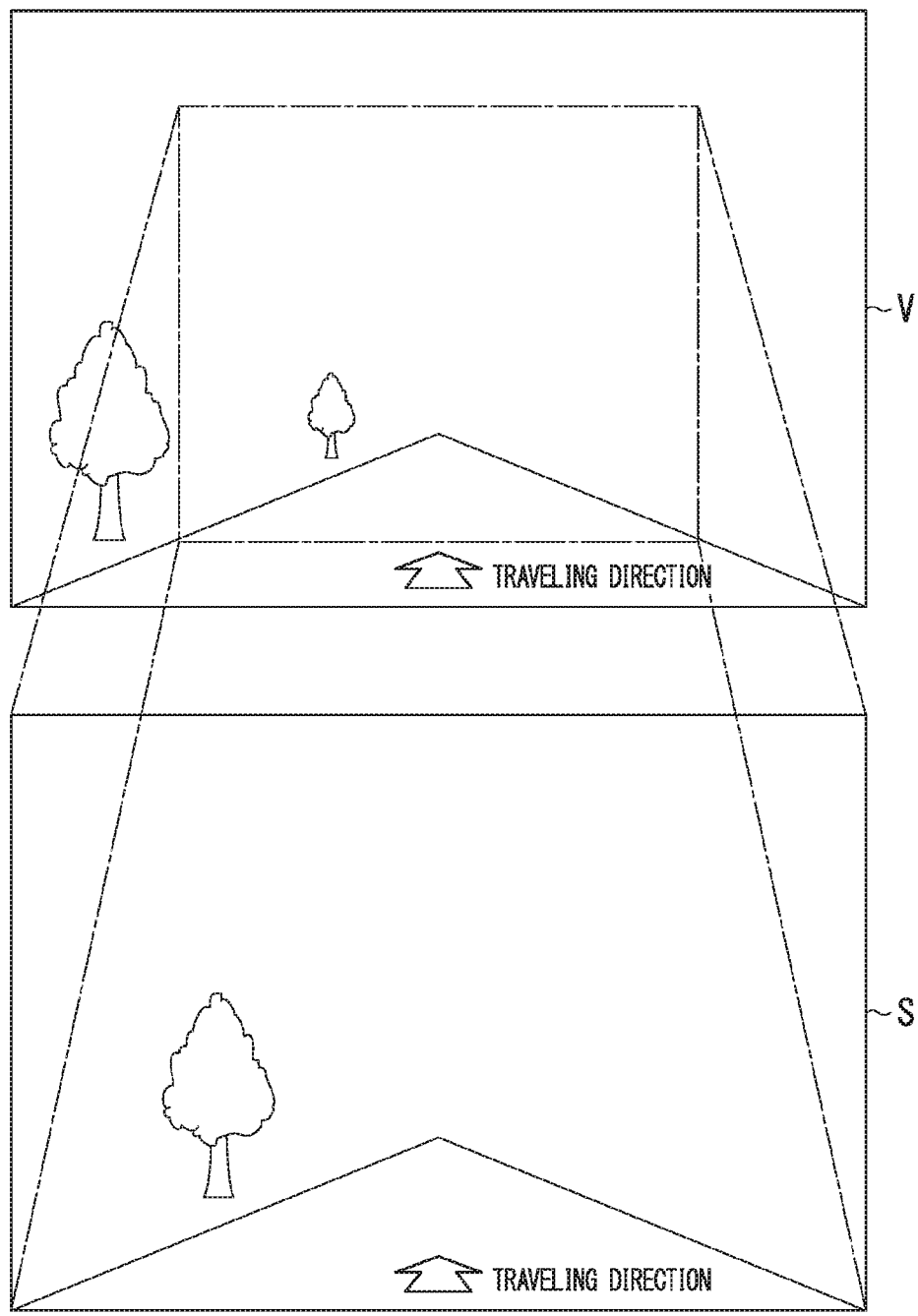
FIG. 10 is a diagram showing an estimated situation S generated by enlarging a part of the captured image V.

In a case that the estimated situation generation unit 321a determines that a change is small in the situation of the imaged vehicle M, a part of the captured image V is enlarged and the image S indicating a corresponding estimated situation after the elapse of the predetermined time may be generated. FIG. 10 is a diagram showing an estimated situation S generated by enlarging the part of the captured image V. For example, in a case that the vehicle M is traveling on a linear road without another vehicle in front, it is estimated that a situation in a case that the predetermined time has elapsed is similar to a situation shown in an image obtained by enlarging an image near the center of the image at the imaging time on the basis of speed data. Therefore, the estimated situation generation unit 321a generates the enlarged image S as an image in which the estimated situation is indicated.

In addition, the estimated situation generation unit 321a may generate an estimated situation by pre-reading the situation of the vehicle M on the basis of the action plan of the vehicle M acquired by the communication device 310. Referring to the action plan, it is predicted that a situation that cannot be estimated from the imaged situation of the vehicle M in which direction control such as a right turn, a left turn, a lane change, or the like of the vehicle M or stopping of the vehicle M was performed will occur in the future. Thus, the estimated situation generation unit 321a generates an estimated situation such as direction control in consideration of an event timing of an action plan and a communication lag.

In this case, the estimated situation generation unit 321a may generate an image indicating the estimated situation as an image synthesized by computer graphics (CG) or the like. In addition, the estimated situation generation unit 321a may be configured to cause the remote operator O to perform a remote operation of sufficiently increasing an inter-vehicle distance or decreasing the speed of the vehicle M in order to prevent contact with another vehicle even if some communication lag occurs and display an image indicating an estimated situation to secure a safety margin. For example, the estimated situation generation unit 321a may be configured to display another vehicle at a distance closer than an actual distance in the image shown in the estimated situation, enlarge a scene in a size larger than an actual size to display the enlarged scene, and cause the remote operator O to perform a remote operation on a safe side. That is, the estimated situation generation unit 321a displays an image indicating the estimated situation to secure the safety margin of the operation to be performed in the remote operation on the basis of the communication environment.

The speaker 322 outputs a warning sound in accordance with the approach of an obstacle recognized by the physical object recognition device 16 of the vehicle M to the vehicle M. The remote operator O is seated on the seat 323. The presentation unit 321 displays an image indicating the estimated situation and causes the remote operator O to operate the steering wheel 324, the pedals 325, and the like with respect to the driving operating elements. Operation amounts therefor are detected by a sensor (not shown) and output to the remote operation reception unit 330. The driving operating element may be another type of driving operating element such as a joystick. The remote operation reception unit 330 outputs information associated with an amount of operation input from the driving operating element to the remote operation control unit 340. The remote operation control unit 340 generates control information to be transmitted to the vehicle M on the basis of the information associated with the amount of operation input from the driving operating element. The control information is transmitted by the communication device 310.

The communication device 310 transmits the control information generated as described above to vehicle M. Also, a reaction force output device for causing a reaction force to be produced by an amount of operation to act is attached to the driving operating element. It is preferable that information such as speed and angular velocity be supplied from the vehicle M to the remote operation device 320 in order to accurately determine the reaction force. The control information to be transmitted is, for example, the amount of operation on the steering wheel 324 or the pedals 325.

Figure 11:
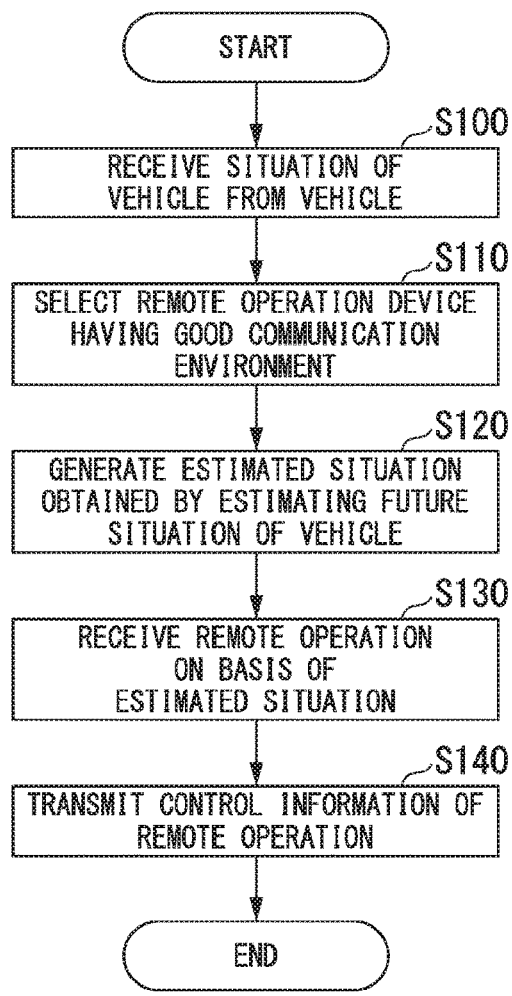
FIG. 11 is a flowchart showing a flow of a process of the remote operation system 300.

Next, a flow of a process of the remote operation system 300 will be described. FIG. 11 is a flowchart showing the flow of the process of the remote operation system 300. After the remote operation request is received, the remote operation system 300 receives information including the situation of the vehicle M from the vehicle M via the communication device 310 (step S100). The selection unit 311 selects one remote operation device 320 having a good communication environment with respect to the vehicle M from among the plurality of remote operation devices 320 (step S110). In the selected remote operation device 320, the estimated situation generation unit 321a generates an image indicating the estimated situation of the vehicle M obtained by pre-reading the situation of the vehicle M. Then, an image indicating the estimated situation is displayed on the display unit 321b (step S120).

The remote operation reception unit 320 receives each operation of the remote operator O based on the estimated situation displayed on the display unit 321b (step S130). The remote operation control unit 340 transmits each operation of the remote operator O received by the remote operation reception unit 320 as control information to vehicle M via the communication device 310 (step S140).

Although the remote operation system 300 selects one remote operation device 320 from among the plurality of remote operation devices 320 using the selection unit 311 after the remote operation request is received in the above-described step 110, one remote operation device 320 may be selected automatically without depending on the selection unit 311. For example, after the remote operation request is selected, the communication device 310 may be configured to monitor the communication environment and automatically select one remote operation devices 320 having the best communication environment with respect to the vehicle M from among the plurality of remote operation devices 320.

Figure 12:
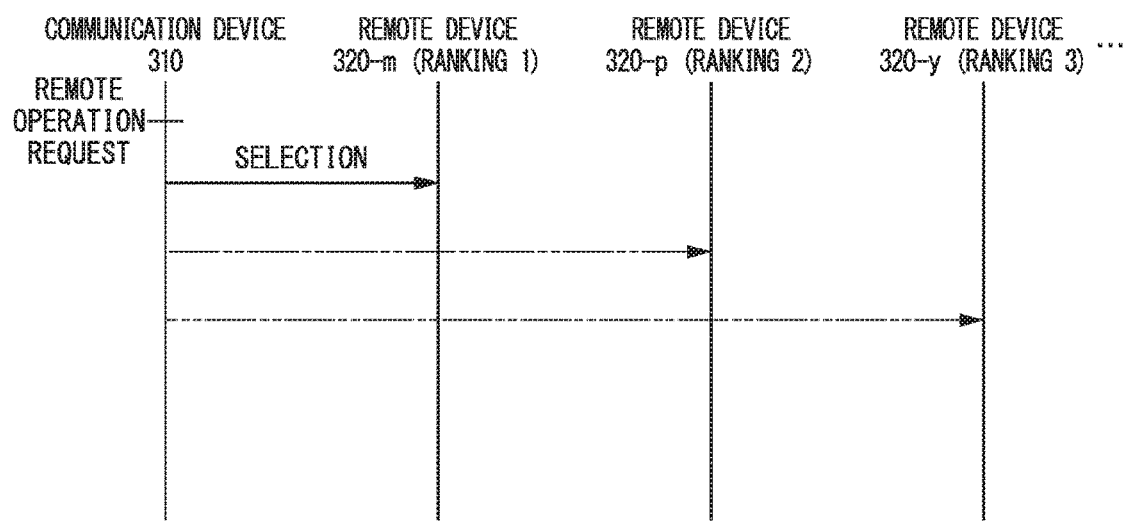
FIG. 12 is a sequence diagram showing a process of automatically selecting a remote operation device 320.

FIG. 12 is a sequence diagram showing a process of automatically selecting the remote operation device 320. In FIG. 12, m, p, and y are positive integers. Remote control requests are randomly transmitted from a plurality of vehicles M in which automated driving is performed. The communication device 310 ranks the plurality of remote devices 320 in descending order of communication environments with respect to the vehicle M. The communication device 310 first selects a remote device 320-m having the best communication environment with respect to the vehicle M. The communication device 310 establishes a communication connection between the vehicle M and the remote device 320-m. In a case that the communication connection between the vehicle M and the remote device 320-m cannot be established, the communication device 310 first selects a remote device 320-p having the second best communication environment with respect to the vehicle M.

The communication device 310 then establishes a communication connection between the vehicle M and the remote device 320-p. If the communication device 310 cannot establish the communication connection between the vehicle M and the remote device 320-p, the communication device 310 selects a remote device 320-y having the third best communication environment with respect to the vehicle M. In a case that the communication device 310 cannot establish a communication connection with the remote device 320-y, the communication device 320 having a better communication environment next to the remote device 320-y may be selected as described above.

According to the transportation system 1 of the first embodiment described above, in a case that the vehicle M in which the automated driving is being performed is switched from the automated driving to the remote operation, it is possible to select the best remote device 320 having one best communication environment with respect to the vehicle M from among the plurality of remote devices 320.

Also, according to the transportation system 1, even if a communication lag occurs in communication between the vehicle M and the remote operation system 300, the remote operation of the remote operator O can be received with the influence of the communication lag reduced. In the transportation system 1, in a case that the remote operation system 300 receives a situation of the vehicle M acquired by the vehicle M, because the remote operation system 300 generates and displays an image indicating an estimated situation obtained by pre-reading the situation of the vehicle M, the remote operator O can operate the steering wheel 324 and the pedals 325 in accordance with a future situation outside the vehicle.

Second Embodiment

In the first embodiment, the reception of an operation required by a vehicle in the future from the remote operator O by generating an estimated situation on the remote operation system 300 side with respect to a communication lag between the vehicle M and the remote operation system 300 has been described. In a second embodiment, a vehicle M side pre-reads a situation of a vehicle M and transmits a pre-read future situation of the vehicle M to a remote operation system 300.

Figure 13:
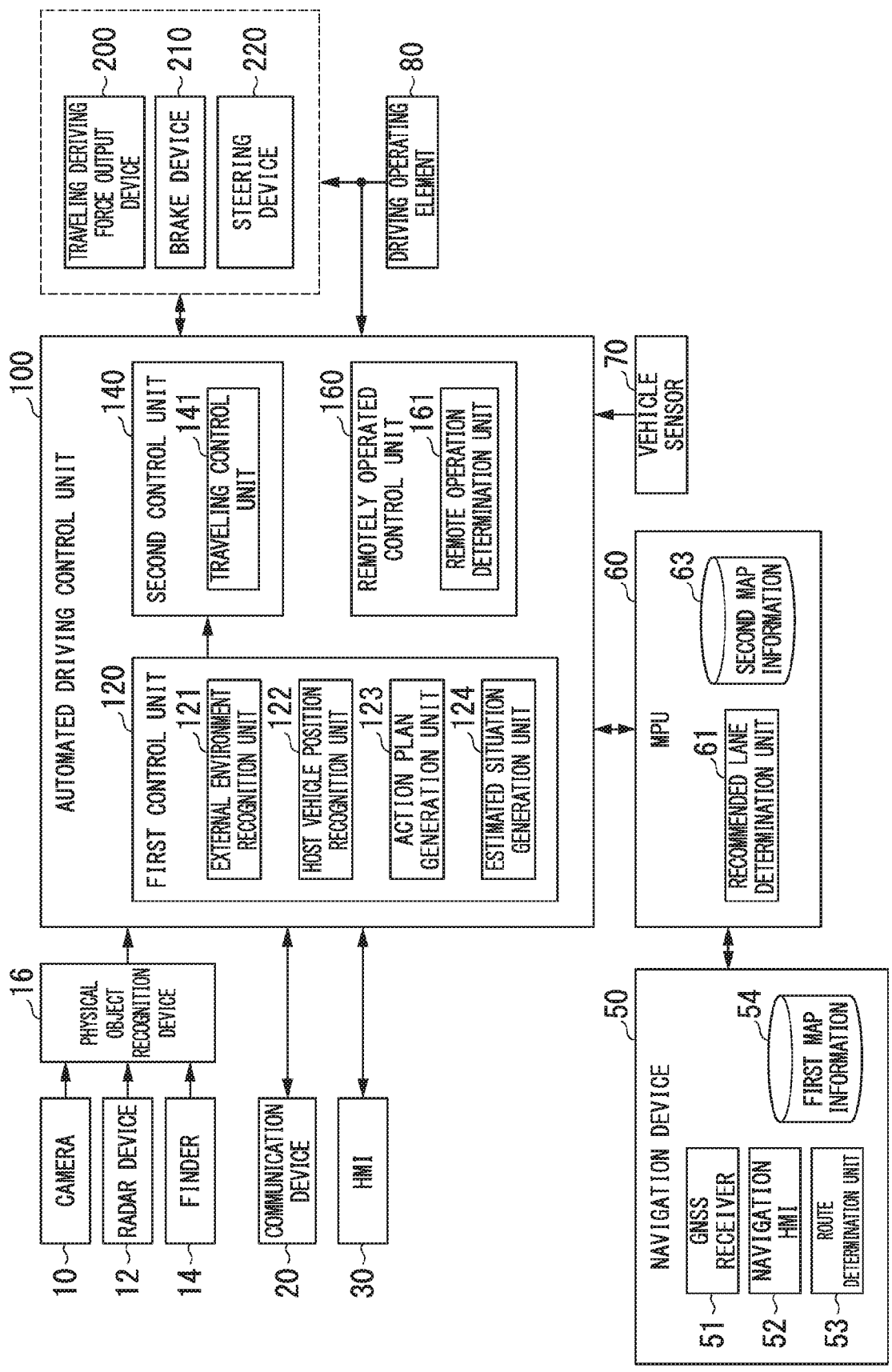
FIG. 13 is a diagram showing an example of components mounted on a vehicle M according to a second embodiment.

FIG. 13 is a diagram showing an example of components mounted on the vehicle M according to the second embodiment. The vehicle M transmits pre-read information instead of the situation acquired by the vehicle M to the remote operation system 300. In the second embodiment, the first control unit 120 of the vehicle M includes an estimated situation generation unit 124.

The estimated situation generation unit 124 calculates a communication lag between a communication device 20 and the remote operation system 300. Then, the estimated situation generation unit 124 generates an estimated situation estimated after the elapse of a predetermined time associated with the communication lag from the situation of the vehicle M imaged by the camera 10 on the basis of the communication lag. At this time, the estimated situation generation unit 124 may estimate the situation of the vehicle M with reference to the action plan generated by the action plan generation unit 123 and generate an image indicating the estimated situation. The estimated situation generated by the estimated situation generation unit 124 is transmitted to the remote operation system 300 via the communication device 20. In the remote operation system 300 receiving the estimated situation, the remote operator O performs a remote operation while viewing an image indicating the displayed estimated situation.

According to the second embodiment described above, the future situation of the vehicle M can be transmitted to the remote operation system 300 by pre-reading the situation of the vehicle M on the vehicle M side. Thereby, the transportation system 1 can perform processing related to the estimated situation in each vehicle M and can distribute the load of the remote operation system 300.

Third Embodiment

In the first embodiment and the second embodiment, the generation of the estimated situation from the situation of the vehicle M imaged by the camera 10 has been described. In a third embodiment, an image indicating an estimated situation is generated using an image captured by an imaging device other than a camera 10.

Figure 14:
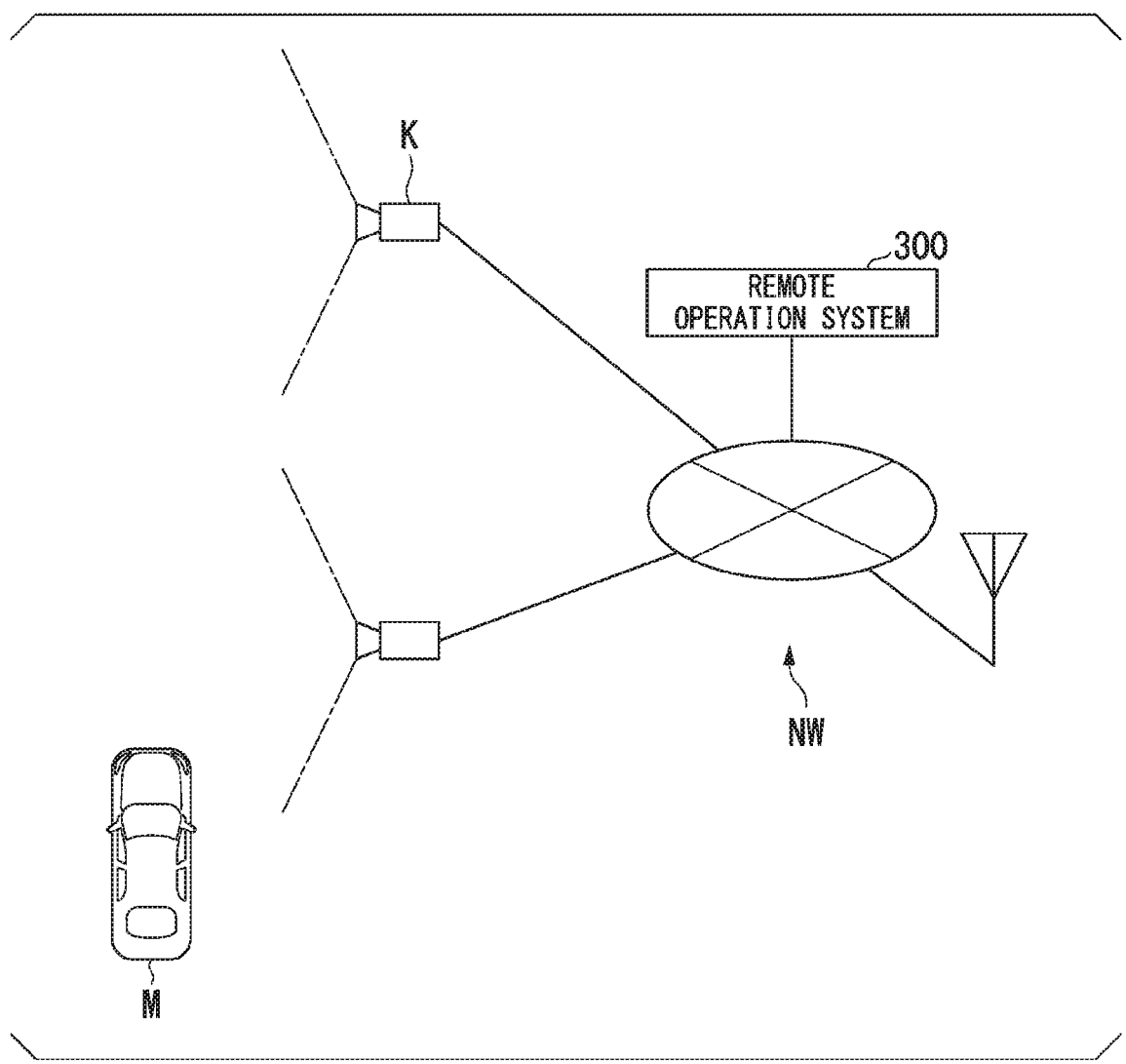
FIG. 14 is a diagram showing a state of a vehicle imaged by a fixed point camera K.

FIG. 14 is a diagram showing a state of the vehicle imaged by a fixed point camera K. On a network NW, there is a street view which provides the scene imaged by the fixed point camera K in real time. The fixed point camera K has, for example, a 360-degree field of view and a zoom function and a user can freely set a viewpoint direction and a zoom with respect to an image of the imaged scene.

In a case that the vehicle M is located within the field of view of the fixed point camera K, an image indicating the estimated situation may be generated as an image synthesized using an image of a scene captured by the fixed point camera K. The estimated situation generation unit 321a generates a scene of the estimated situation from the image of the fixed point camera K in correspondence with a future position estimated from the current position of the vehicle M. The estimated situation generation unit 321a generates the scene of the estimated situation by determining the viewpoint direction and the zoom. A moving physical object is estimated and generated at a position in a case that a predetermined time has elapsed and synthesized into an estimated scene. Thereby, an image showing the estimated situation is generated.

According to the third embodiment described above, it is possible to reduce a volume of image data of a situation of the vehicle M to be transmitted and received between the vehicle M and the remote operation system 300 and reduce a communication lag using image data of a scene imaged by the fixed point camera K connected to the network NW.

Although modes for carrying out the present invention have been described above using embodiments, the present invention is not limited to these embodiments at all and various modifications and substitution can be made without departing from the spirit and scope of the present invention.

REFERENCE SIGNS LIST

1 Transportation system
10 Camera
16 Physical object recognition device
20 Communication device
30 HMI
80 Driving operating element
100 Automated driving control unit
120 First control unit
124 Estimated situation generation unit
140 Second control unit
160 Remotely operated control unit
161 Remote operation determination unit
300 Remote operation system
310 Communication device
311 Selection unit
320 Remote operation device
321 Presentation unit
321a Estimated situation generation unit
330 Remote operation reception unit
340 Remote operation control unit

The invention claimed is:

1. A remote operation system for a vehicle, the remote operation system comprising:
a plurality of remote operation devices, each of which includes,
a communication unit configured to communicate with the vehicle and receive information including a remote operation request;
a selection unit
a presentation unit configured to present a situation of the vehicle received from the vehicle by the communication unit to a remote operator;
a reception unit configured to receive an operation of the remote operator; and
a control unit configured to generate control information on the basis of the operation received by the reception unit and transmit the control information to the vehicle using the communication unit,
wherein the selection unit is configured to preferentially select a remote operation device having a highest communication rate or a most stable communication with respect to the vehicle transmitting the remote operation request among the plurality of remote operation devices,
the remote operation device selected by the selection unit among the plurality of remote operation devices executes a remote operation,
the presentation unit estimates a future situation of the vehicle on the basis of the situation of the vehicle received from the vehicle by the communication unit and presents the estimated future situation of the vehicle to the remote operator, and the presentation unit displays an image based on the situation of the vehicle received from the vehicle by the communication unit and further displays an image obtained by enlarging a part of an image based on the situation of the vehicle received from the vehicle by the communication unit as an image indicating the future situation of the vehicle in a case that the situation of the vehicle received from the vehicle by the communication unit is a situation in which there are few physical objects in front of the vehicle.

2. The remote operation system according to claim 1, wherein the communication unit acquires information about an action plan of automated driving from the vehicle, and wherein the presentation unit estimates the future situation of the vehicle on the basis of the action plan.

3. The remote operation system according to claim 1, wherein the presentation unit generates an image indicating the future situation of the vehicle by synthesizing a fixed point observation image and an image based on the situation of the vehicle received from the vehicle by the communication unit.

4. The remote operation system according to claim 1, comprising:
a determination unit configured to determine whether or not a route including a predicted communication failure occurrence position is included in a scheduled route along which the vehicle will travel; and
a change unit configured to change a route so that the predicted communication failure occurrence position is avoided in a case that the determination unit determines that the route including the predicted communication failure occurrence position is included.

5. A transportation system comprising:
the remote operation system according to claim 1; and
a vehicle control system mounted on the vehicle that receives the remote operation.

6. The transportation system according to claim 5, wherein the vehicle control system estimates a future situation of the vehicle on the basis of a situation of the vehicle and transmits the estimated future situation of the vehicle to the remote operation system.

7. The transportation system according to claim 6, wherein the vehicle control system executes automated driving on the basis of an action plan and estimates the future situation of the vehicle on the basis of the action plan.

8. A remote operation method using a transportation system according to claim 1, the method comprising:
a step that the communication unit communicates with a vehicle and receives information including a remote operation request,
a step that the presentation unit presents a situation of the vehicle received from the vehicle by the communication unit to a remote operator,
a step that the reception unit receives an operation of the remote operator,
a step that the control unit generates control information on the basis of the operation received by the reception unit and transmits the control information to the vehicle using the communication unit,
a step that the selection unit preferentially selects a remote operation device having a highest communication rate or a most stable communication with respect to the vehicle transmitting the remote operation request among the plurality of remote operation devices, and
a step that a remote operation device selected by the selection unit among the plurality of remote operation devices, executes a remote operation,
wherein the presentation unit estimates a future situation of the vehicle on the basis of the situation of the vehicle received from the vehicle by the communication unit and presents the estimated future situation of the vehicle to the remote operator, and
the presentation unit displays an image based on the situation of the vehicle received from the vehicle by the communication unit and further displays an image obtained by enlarging a part of an image based on the situation of the vehicle received from the vehicle by the communication unit as an image indicating the future situation of the vehicle in a case that the situation of the vehicle received from the vehicle by the communication unit is a situation in which there are few physical objects in front of the vehicle.

\* \* \* \* \*